Oct. 9, 1945. V. L. TANNEHILL 2,386,726
VALVE
Filed June 7, 1943 2 Sheets-Sheet 1
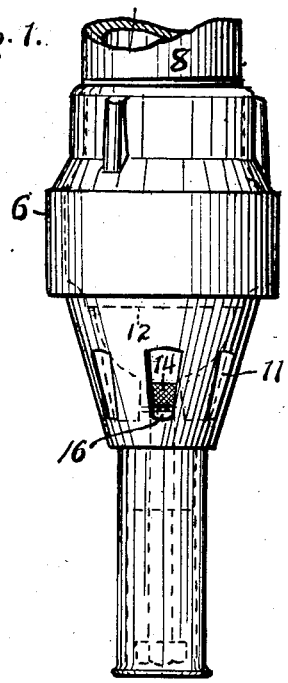
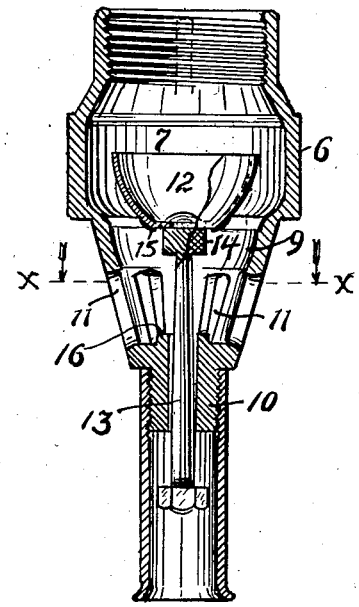
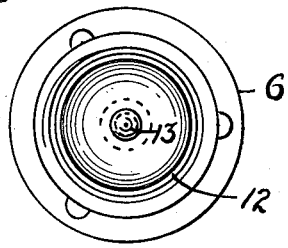
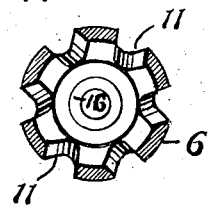
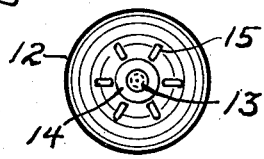
Vernon L. Tannehill INVENTOR.
BY H. G. Burns Oct. 9, 1945.   V. L. TANNEHILL   2,386,726
VALVE
Filed June 7, 1943   2 Sheets-Sheet 2

Vernon L. Tannehill   INVENTOR.
BY   H. G. Burns

Patented Oct. 9, 1945

2,386,726

UNITED STATES PATENT OFFICE 2,386,726

VALVE

Vernon L. Tannehill, Fort Wayne, Ind.

Application June 7, 1943, Serial No. 489,896

1 Claim. (Cl. 251—119)

This invention relates to improvements in valves of that type used in connection with either the suction or the discharge pipe line of a pump to sustain the head or pressure of the fluid developed in the line by the pump.

One of the objects of the invention is to afford a valve and housing therefor so related that flow of fluid through the housing in one direction is substantially unimpeded by the valve and is definitely prevented from retracting whenever outflow of the fluid through the housing ceases.

Another object of the invention is to construct the valve and its stem so that the valve automatically adjusts itself accurately upon the valve seat in the housing whenever effected by back pressure of the transient fluid within the housing occurs beyond the valve seat.

A further object of the invention is to construct the valve, its stem and guide therefor so as to permit the valve to automatically adjust itself evenly upon the valve seat when closed by back pressure of the fluid, without binding or hindrance of the stem against its guide, thus to insure precise seating of the valve.

A still further object of the invention is to provide a valve of light weight and flexibility so as to insure ready response to outflow of fluid through the housing chamber and exact conformity to the valve seat when closed and influenced with force of back pressure of the fluid in the pipe line beyond the valve.

And another object of the invention is to provide means to cause axial rotation of the valve by flow of fluid into and out through the housing so that wear of the contacting surfaces of the valve and its seat is uniformly distributed.

Other objects and advantages of the invention appear in the following description.

An illustrative embodiment of the invention is shown in the accompanying drawings, in which:

Fig. 1 is a side elevational view of a structure in which the invention is incorporated;

Fig. 2 is a top plan view projected from Fig. 1;

Fig. 3 is an elevational view in vertical section of the structure shown in Fig. 1;

Fig. 4 is a cross-section of the valve housing on the line $x$—$x$ of Fig. 3;

Fig. 5 is a bottom plan view of the valve and its stem;

Figure 6:
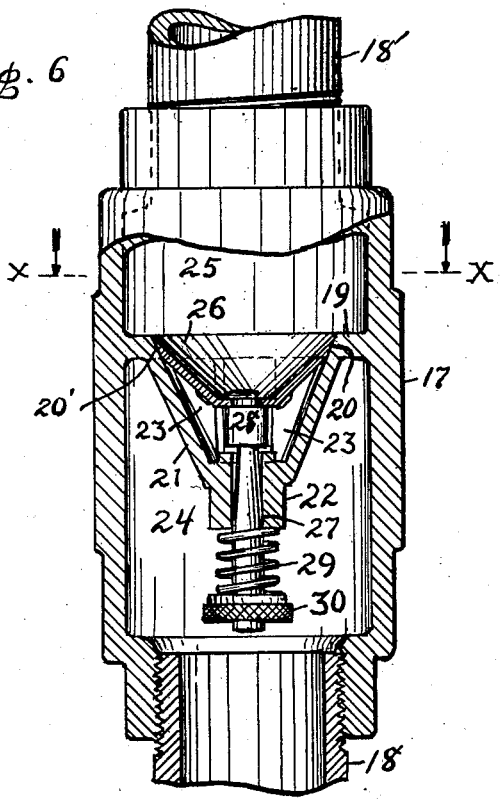
Fig. 6 is a side elevational view partly in section showing another form of the invention.

The illustrative embodiment of the invention in a form suitable as a foot valve, shown in Figs. 1 to 5 inclusive, consists of a valve housing 6 having a chamber 7 therein that has free communication with a suction pipe 8 that is secured in the top of the housing. The lower end portion of the housing has therein a curved annular valve seat 9, and is tapered downward toward the axis of the housing and terminates with a threaded appendage having an axial bore constituting a guide 10.

The wall of the tapered part of the housing beneath said valve seat has an annular series of intake ports 11 that preferably are similarly tangential, with respect to a circle surrounding the axis of the housing, so that fluid drawn through the ports into the housing swirls more or less.

A valve 12 is provided made of thin sheet metal shaped like a cup and has flexibility to such extent as to readily conform to the valve seat 9, when under back pressure, in order to compensate for any slight irregularity of the seat if out of true. In this manner the valve is flexed so that its entire contacting surface fits accurately against that of the seat by the urge of the back pressure of fluid within the housing chamber whenever the valve is closed.

The valve 12 is provided with a pendent stem 13, the upper end of which has a head 14 upon which is secured the valve. The stem extends through the guide 10, its lower portion approximately fitting the bore of the guide for free axial movement therein so that when the valve is raised to its full open position, it is then disposed in axial alinement with the valve seat. The upper part of the stem, from approximately the midportion thereof to the head 14, is tapered, its minimum diameter being at its juncture therewith, so as to permit lateral play of the stem in the guide as the valve approaches its seat in closing. Preferably, the base of the valve, on its lower face, is provided with an annular series of radial vanes 15, formed in any suitable manner, such as by forming embossments on the valve itself or by providing a spider beneath the valve to form the vanes. These vanes when encountered by the swirling fluid passing through the housing tend to cause angular rotation of the valve, so that its contacting surface creeps angularly with respect to the contacting surface of the valve seat, thus to obviate excessive wear between the valve and valve seat in any particular region.

Another feature of the invention is the provision of a stop 16 disposed in the bottom portion of the housing, the top of which is located at a point spaced slightly below the bottom face of the head 14 when the valve is closed under normal operating conditions. Further downward progress of the valve 12 after seating is limited by contact of the head with the stop. Thus, if sudden excessive back pressure on the valve occurs in closing, crippling flexure of the valve is averted.

The contacting surfaces of the valve and the valve seat are horizontally circular and arcuate endwise, their diameters being greatest at their upper ends and diminishing with uniform curvature downward therefrom. As the valve wall is of slight thickness and to some extent flexible, the valve becomes expanded outwardly against the parallel arcuate contact surface of the valve seat with increasing force as the back pressure of fluid in the housing chamber is increased, thus enhancing intimacy of contact between the valve and seat upon closing of the valve.

Figure 7:
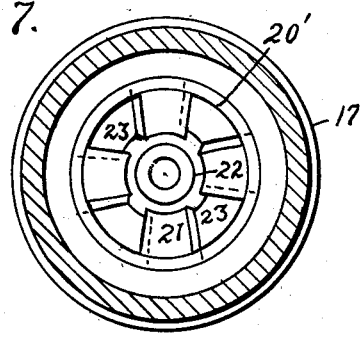
Fig. 7 is a projection from Fig. 1 in transverse section on the line $x$—$x$ thereof.

The illustrative embodiment of the invention in a form suitable as a check valve for connection at an intermediate point in a pipe line, as shown in Figs. 6 and 7, consists of a hollow coupling 17 in the opposite ends of which are secured members 18–18' of the pipe line. Within the coupling is a transverse partition 19 having a central valve opening 20 therein, and provided with a pendent spider 21 that terminates at its lower end with an appendage having an axial bore constituting a guide 22. The spider 21 has a series of passageways 23 that afford communication between the lower chamber 24 of the coupling and the upper chamber 25 thereof. The wall of the partition surrounding the opening tapers downwardly and forms a valve seat 20' for the reception of a valve 26 by which the opening 20 is closed.

Preferably, the valve is in the form of a hollow shell, the walls of which are thin and taper downwardly at a more acute angle than the valve seat so that when the valve is ground to fit the seat the upper marginal edge of the valve shell is of reduced thickness. As in the former instance the valve 26 is made of thin sheet metal, shaped like a conical cup and its walls have more or less flexibility, so that when the valve is seated and under back pressure of fluid in the upper chamber 25, the rim of the valve is thereby expanded outwardly and its contacting surface is impressed uniformly against the valve seat, thus accurately sealing the opening when the valve is closed.

The valve 26 is provided with a pendent valve stem 27 having a head 28 upon which the valve is secured, and the stem extends through the guide 22 in which it has axial movement. The lower portion of said stem fits loosely in the bore of the guide for free axial movement therein and causes centering of the valve when raised, and the upper part of said stem is of reduced diameter so that when the valve approaches its seat, the stem has increased play in the bore of the guide, thereby permitting the valve more readily to adjust itself upon the seat.

If preferred, a compression spring 29 is imposed on the stem between the lower end of the guide and a nut 30 threaded on the lower end of the stem. Thus, the valve is yieldingly held seated through the medium of the spring.

Operation

In use, the valve normally rests of its own weight upon the valve seat, thereby stopping backflow of fluid through the housing. Opening of the valve occurs upon inflow of fluid through the ports and upward through the chamber, and the fluid, due to the tangential arrangement of ports, swirls, and in so passing contacts the fins and imparts torque to the valve which is raised by the upflow of fluid and becomes centered, while in its uppermost position, because of the more or less snug fit of the lower end portion of the stem in the guide. When the upflow ceases the valve returns of its own weight to its seat upon which it is permitted to rest uniformly in contact therewith without hindrance of the stem. This is due to the slenderness of the upper portion of the stem, which, as the valve approaches its seat, has free play in the guide.

Variations from the particular construction above disclosed may be resorted to by the exercise of skill in the art, without departure from the scope of the invention, and the following claim is intended to be inclusive of such variations.

What I claim is:

A valve structure consisting of a hollow housing having a valve seat therein and a portion beneath the seat provided with a guide and inlet ports, a cup-shaped valve made of flexible metal, circular in cross-section and having an exterior of vertical convex curvature, the marginal rim of said valve fitting on said seat, and a stem axially movable in said guide having a head upon which the valve is secured, the lower portion of said stem approximately fitting the bore of the guide wherefore to center the valve when raised, and the upper portion of the stem being of reduced diameter wherefore to permit lateral play of the valve while seating, said head having contact with said guide to limit downward movement of the valve when closed by back-pressure in the housing.

VERNON L. TANNEHILL.